United States Patent [19]

Hamstra et al.

[11] Patent Number: 5,046,182

[45] Date of Patent: Sep. 3, 1991

[54] CODE POINTS FOR TRANSFERRING DATA FROM A NETWORK TRANSMISSION MEDIUM TO A STATION ON THE NETWORK

[75] Inventors: James R. Hamstra, Shorewood, Minn.; Ronald S. Perloff, Poway; Louise Y. Yeung, Sunnyvale, both of Calif.

[73] Assignee: National Semiconductor Corporation, Santa Clara, Calif.

[21] Appl. No.: 444,561

[22] Filed: Dec. 1, 1989

[51] Int. Cl.⁵ ............................................. H04J 3/02
[52] U.S. Cl. .................................... 370/79; 370/85.1; 341/51; 375/25
[58] Field of Search ................... 370/85.1, 85.4, 85.5, 370/4, 79; 341/51, 56, 63, 68, 69; 375/25, 58

[56] References Cited

U.S. PATENT DOCUMENTS

| | | | |
|---|---|---|---|
| 4,866,704 | 9/1989 | Bergman | 370/94.1 |
| 4,878,219 | 10/1989 | Kaufman et al. | 370/85.5 |
| 4,899,146 | 2/1990 | Podolak et al. | 341/51 |
| 4,914,652 | 4/1990 | Nguyen | 370/85.5 |
| 4,926,418 | 5/1990 | Cidon et al. | 370/85.4 |
| 4,954,826 | 9/1990 | Isozaki et al. | 341/68 |

OTHER PUBLICATIONS

Floyd E. Ross, "FDDI-An Overview", Digest of Papers, Computer Soc. Intl. Conf. Compson '87, pp. 434-444.

FDDI Physical Layer Protocol (PHY), Draft Proposed American National Standard, X3T9/85-39, Rev. 13, Aug. 22, 1986.

The Supernet Family for FDDI, Databook, Advanced Micro Devices 1989.

Supernet for Fiber Distributed Data Interface, Articles, Advanced Micro Devices, Sep. '87.

Primary Examiner—Douglas W. Olms
Assistant Examiner—Min Jung
Attorney, Agent, or Firm—Limbach, Limbach & Sutton

[57] ABSTRACT

Apparatus and methods for encoding information characters received by a station from a transmission medium to generate internal code points for retrieval or retransmission by the station. The encoding provides an internal symbol set that is able to pass complete line state information via its internal code points, thereby eliminating the need for extra signals to indicate the current line state. The code points can also report error situations, such as elasticity buffer errors, and can be accepted by the station's transmitter to be encoded and, after appropriate filtering, repeated onto the transmission medium. The internal code points are optimized so that the code point set minimizes the decoding logic at the receiving end, be it the station's Media Access Control function or its transmitter. Furthermore, internally, the station may make use of the internal code points to synchronize the receiver elasticity buffer.

16 Claims, 5 Drawing Sheets

| C=1 D3 D2 | 0 0 | 0 1 | 1 1 | 1 0 D1 D0 |
|---|---|---|---|---|
| 0 0 | N' | H | V' | V |
| 0 1 | X | T | S | R |
| 1 1 | X | JK | X | X |
| 1 0 | X | X | I' | I |

FIG. 4A

| C=0 D3 D2 | 0 0 | 0 1 | 1 1 | 1 0 D1 D0 |
|---|---|---|---|---|
| 0 0 | 0 | 1 | 3 | 2 |
| 0 1 | 4 | 5 | 7 | 6 |
| 1 1 | C | D | F | E |
| 1 0 | 8 | 9 | B | A |

FIG. 4B

INPUT IS PaCa a3a2a1a0 PbCb b3b2b1b0
OUTPUT IS PC d7d6d5d4d3d2d1d0

| | INPUTS | | | | | | | | OUTPUTS | | | |
|---|---|---|---|---|---|---|---|---|---|---|---|---|
| [LATCH1] | XLS | ILS | ALS | U | JK | a3-0 | b3-0 | | P | C | d7-4 | d3-0 |
| I | 0 | x | x | x | 1 | x | x | | P | 1 | I' | ULS |
| Ī | 0 | x | x | U | 1 | x | x | | P | 1 | V' | ULS |
| x | x | x | x | 1 | 0 | n | n | | $\overline{Pa \oplus Pb}$ | 0 | n | n |
| x | x | x | x | 1 | 0 | n | c | | Pb | 1 | 0 | c |
| x | x | x | x | 1 | 0 | c | n | | Pa | 1 | c | 0 |
| x | x | x | x | 1 | 0 | c | c | | Pa⊕Pb | 1 | c | c |
| x | x | x | 1 | x | U | x | x | | P | 1 | I' | ULS |
| x | x | 1 | x | x | U | x | x | | P | 1 | V' | ULS |

P=0 OR 1 DEPENDING ON LINE STATE BITS.
U IMPLIES THE UNKNOWN BIT COULD BE EITHER 1 OR 0.
LS MEANS LINE STATE BITS FROM LINE STATE DETECTOR.
BIT WISE OPTIMIZED, 2 LEVEL + 1 MUX TRANSFER
I' = 1011
V' = 0011

FIG. 7

CODE POINTS FOR TRANSFERRING DATA FROM A NETWORK TRANSMISSION MEDIUM TO A STATION ON THE NETWORK

COPYRIGHT NOTICE

Portions of the disclosure of this patent document contain material which is the subject of copyright protection. The copyright owner, National Semiconductor Corporation, has no objection to the facsimile reproduction by anyone of the patent document or the patent disclosure, as it appears in the U.S. Patent and Trademark Office patent files or records, but otherwise reserves all rights.

BACKGROUND OF THE INVENTION

1. Field of the Invention

The present invention relates to data transmission networks and, in particular, to a method and apparatus for encoding information received by a station from a network transmission medium for presentation to a receiving station or for repetition back onto the medium in a reliable, compact and timely manner.

2. Discussion of the Prior Art

Communication between stations in a data transmission network occurs through the transmission of a series, or "frame", of information characters, with adjacent frames being separated by explicit or implicit start-stop code patterns. The use of a unique start pattern ("start delimiter") and a unique stop pattern ("end delimiter") allows the receiving station to identify the exact beginning and the exact end of each received frame.

A particular type of network format is defined by the Fiber Distributed Data Interface (FDDI) protocol. The FDDI protocol is an American National Standard (ANS) for data transmission which applies to a 100 Mbit/second token ring network that utilizes an optical fiber transmission medium. The FDDI protocol is intended as a high performance interconnection among computers as well as among computers and their associated mass storage sub-systems and other peripheral equipment.

Information is transmitted on an FDDI ring in frames that consist of a sequence of 5-bit characters or "symbols" with each symbol representing 4 data bits. Information is typically transmitted in symbol pairs or "bytes". Tokens are used to signify the right to transmit information between stations.

Of the thirty-two member FDDI standard symbol set, sixteen are data symbols (each representing 4 bits of ordinary binary data) and eight are control symbols. The eight control symbols are J (the first symbol of a start delimiter byte JK), K (the second symbol of a start delimiter byte JK), I (Idle), H (Halt), Q (Quiet), T (End Delimiter), S (Set) and R (Reset).

A continuous stream of control symbol patterns defines a line state. The FDDI protocol defines four line states:

(1) Idle Line State (ILS), which is a continuous stream of Idle symbols;
(2) Quiet Line State (QLS), which is a continuous stream of Quiet symbols;
(3) Halt Line State (HLS), which is a continuous stream of Halt symbols; and
(4) Master Line State (MLS), which is a continuous stream of alternating Halt and Quiet symbols.

The remaining eight symbols of the FDDI standard symbol set are not used since they violate code run length or DC balance requirements of the protocol.

TABLE I

FDDI STANDARD SYMBOL SET

| SYMBOL | CODE |
|---|---|
| 0 | 11110 |
| 1 | 01001 |
| 2 | 10100 |
| 3 | 10101 |
| 4 | 01010 |
| 5 | 01011 |
| 6 | 01110 |
| 7 | 01111 |
| 8 | 10010 |
| 9 | 10011 |
| A | 10110 |
| B | 10111 |
| C | 11010 |
| D | 11011 |
| E | 11100 |
| F | 11101 |
| J | 11000 |
| K | 10001 |
| I | 11111 |
| H | 00100 |
| Q | 00000 |
| T | 01101 |
| S | 11001 |
| R | 00111 |

FIG. 1 shows the fields which are used within the FDDI frame and token formats. A preamble field (PA), which consists of a sequence of Idle line-state symbols, precedes every transmission. The Idle symbols provide a maximum frequency signal which is used for receive clock synchronization. The Start Delimiter field (SD) consists of a two symbol start delimiter pair which is uniquely recognizable independent of symbol boundaries. As stated above, the Start Delimiter byte establishes the boundaries for the information that follows. The Frame Control field (FC) defines the type of frame and its characteristics; it distinguishes synchronous from asynchronous transmission, specifies the length of the address and identifies the type of frame. The Frame Control field uniquely distinguishes a token. The Ending Delimiter field (ED) of a token consists of two end delimiter symbols and completes a token. The Destination Address (DA) and Source Address (SA) fields contain the destination and source addresses of the transmitted frame. The Destination Address field and the Source Address field are both either two bytes or six bytes long, as determined by the Frame Control field. The Destination Address may be either an individual address or a group address. The Frame Check Sequence field (FCS), which is four bytes long, contains a cyclic redundancy check using a standard polynomial. The INFORMATION field, as is the case for all fields covered by the Frame Check Sequence check, consists only of data symbols. The End Delimiter of a frame is one end delimiter symbol (T), which is followed by the Frame Status field (FS) which consists of three control indicator symbols which indicate whether the addressed station has recognized its address, whether the frame has been copied, or whether any station has detected an error in the frame. The "T" followed by three control indicators represents the minimum end of frame sequence (EFS) required by the FDDI protocol for a non-token frame. The protocol allows for additional pairs of control symbols in the EFS or an additional odd number of control symbols followed by one last "T"

symbol. All conforming implementations must be able to process these extended end of frame sequences without truncating them. The end delimiter "T" and the two control symbols "R" and "S" are uniquely encoded and distinguishable from either normal data or Idle symbols.

FIG. 2 shows the component functions necessary for a station to be in compliance with the FDDI protocol. The identified components include a Station Management function (SMT) which is a part of network management that resides in each station on the network to control the overall action of the station to ensure its proper operation as a member of the ring. A Physical Layer Medium Dependent (PMD) function provides the fiber-optic links between adjacent stations on the ring. A Physical Layer Protocol (PHY) function provides the encoding, decoding, clocking and synchronization functions. A Media Access Control (MAC) function controls access to the transmission medium, transmitting frames to and receiving frames from the Media Access Control function of other stations.

The PHY function simultaneously receives and transmits. The PHY function's transmit logic accepts symbols from the Media Access Control function, converts these symbols to 5-bit code-groups and transmits the encoded serial stream on the medium. The PHY function's receive logic receives the encoded serial stream from the medium, establishes symbol boundaries based on the recognition of a start delimiter symbol pair and forwards decoded symbols to its associated Media Access Control function.

Additional information regarding the FDDI protocol is presented by Floyd E. Ross, "FDDI—an Overview", Digest of Papers, Computer Soc. Intl. Conf., Compcon '87, pp. 434-444, which is hereby incorporated by reference to provide additional background information for the present invention.

A primary service of the FDDI PHY function is to ensure that information received from the fiber optic transmission medium is presented to the Media Access Control function in the most reliable, compact and timely manner.

One source of errors in received information results from the incoming data being corrupted along the transmission medium. Various subfunctions within the PHY function alert the Media Access Control function of possible data corruptions so that the Media Access Control function can discard corrupted frames and take other appropriate receiving actions.

Another source of errors in received information results from the transit of symbols between the PHY function and the Media Access Control function or other PHY functions. Since there are applications that involve physically locating the PHY functions and Media Access Control functions across different boards, potential corruptions can occur across busses, just as they can occur in any large system bus. To allow the detection of such errors, the information transferred between the PHY function and the Media Access Control function can be coded with a parity bit.

The FDDI protocol also requires that the PHY function monitor line states that result from the accumulation of certain received symbols. This line state monitoring information is reported to the Station Management function so that the Station Management function may take appropriate action.

U.S. Pat. No. 4,530,088, titled GROUP CODING SYSTEM FOR SERIAL DATA TRANSMISSION, issued July 16, 1985 to James R. Hamstra, co-inventor of the present invention, and Robert K. Moulton, discloses a system for encoding binary data and control signals serially transmitted between two or more communicating stations and which is applicable to FDDI networks. The system includes two registers: a data register that receives and stores input data groups and a control register that receives and stores input control codes. An input selector multiplexes the contents of the data and control registers to an encoding function. The encoded data and control groups are then provided to a shift register which applies them serially to a transmission medium.

According to another known PHY function implementation for transferring FDDI symbols from the FDDI fiber optic transmission medium to a Media Access Control function, Non-Return-to-Zero-Inverton-One (NRZI) FDDI data serially received by the PHY function from the medium is first converted to Non-Return-to-Zero (NRZ) format. Then a shifter performs serial to 10-bit parallel conversion of the NRZ data. The 10-bit FDDI symbol pair is then parallel loaded into a framer. The framer detects patterns in the 10-bit binary combinations for establishing FDDI symbol boundaries as required. Each of the two FDDI symbols comprising the shifted 10-bit FDDI symbol pair is then parallel loaded into a register in a 4B/5B decoder. The decoder performs 4B/5B decoding for the two symbols and generates parity for the 10-bit decoded output. Framing and control logic associated with the framer generates timing pulses to load the two decoder registers and to write data from the decoder into an elasticity buffer. Data is then clocked from the elasticity buffer through a synchronization register. The synchronization register forces violation symbols into a receiver multiplexor under two conditions. The first condition is elasticity buffer overflow/underflow. The second condition occurs when line state decoder logic detects the presence of Quiet, Halt, Master, Idle or Noise Line States at the output of the synchronization register; detection of any one of these line states causes an invalid symbol to be sent out of the synchronization register. However, the invalid symbol does not identify the type of line state. The output of the synchronization register is made available via a smoothing function to a receiver bus for access by an associated Media Access Control function.

SUMMARY OF THE INVENTION

The present invention provides a method and apparatus that may be utilized for encoding external information characters received from a transmission medium by a station on a data transmission network to an internal set of code points for retrieval or retransmission by the receiving station. Generation of internal code points in accordance with the present invention provides a minimal internal symbol set that integrates complete line state information, thereby eliminating the need for extra signals to indicate line state condition. Additionally, information is integrated within the internal code points to report error situations, like elasticity buffer errors. The internal code points can also be accepted by the station's transmitter to be encoded and, with appropriate filtering, repeated onto the transmission medium. Furthermore, internal code point groupings are optimized so that decoding logic is minimized at the receiving end, be it the station's Media Access Control function or its transmitter. Internally, the station makes use of the code points to synchronize the receiver elasticity buffer, an entity crucial in ensuring that a correct replica of the data received from the medium is provided for retrieval or retransmission.

Other features and advantages of the present invention will be understood and appreciated by reference to the detailed description of the invention provided below which should be considered in conjunction with the accompanying drawings.

BRIEF DESCRIPTION OF THE DRAWINGS

FIGS. 4A and 4B are a control code map and a data code map, respectively, illustrating the translation of the FDDI standard symbol set to internal code points in accordance with the present invention.

FIG. 7 is a state table illustrating the code point mapping provided by a post decoder functioning in accordance with the present invention.

DETAILED DESCRIPTION OF THE INVENTION

Figure 1:
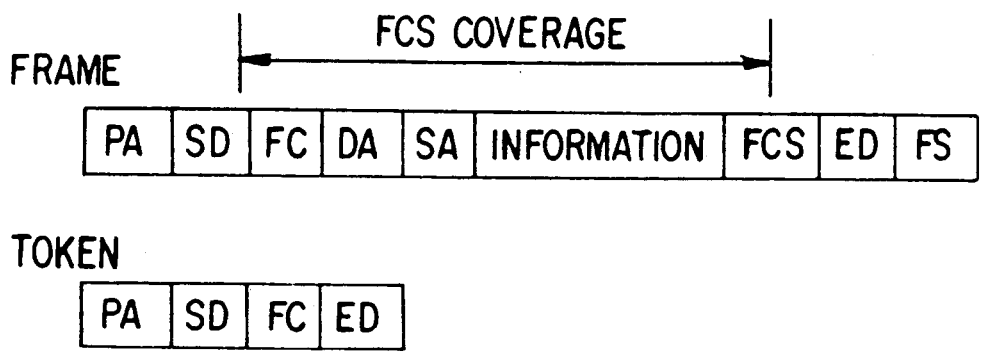
FIG. 1 is a diagram illustrating the fields used within the FDDI frame and token formats.
Figure 2:
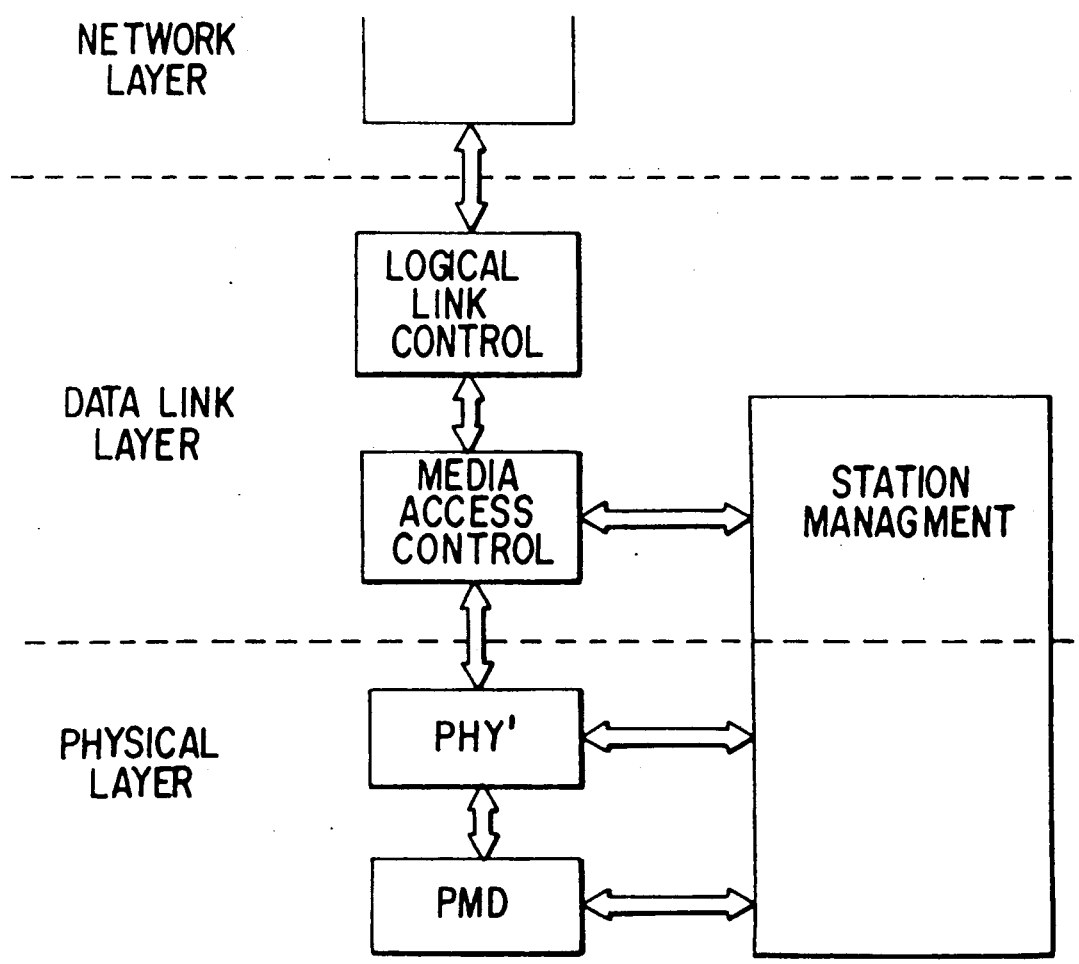
FIG. 2 is a block diagram illustrating the components required for a station in compliance with the FDDI protocol.
Figure 3:
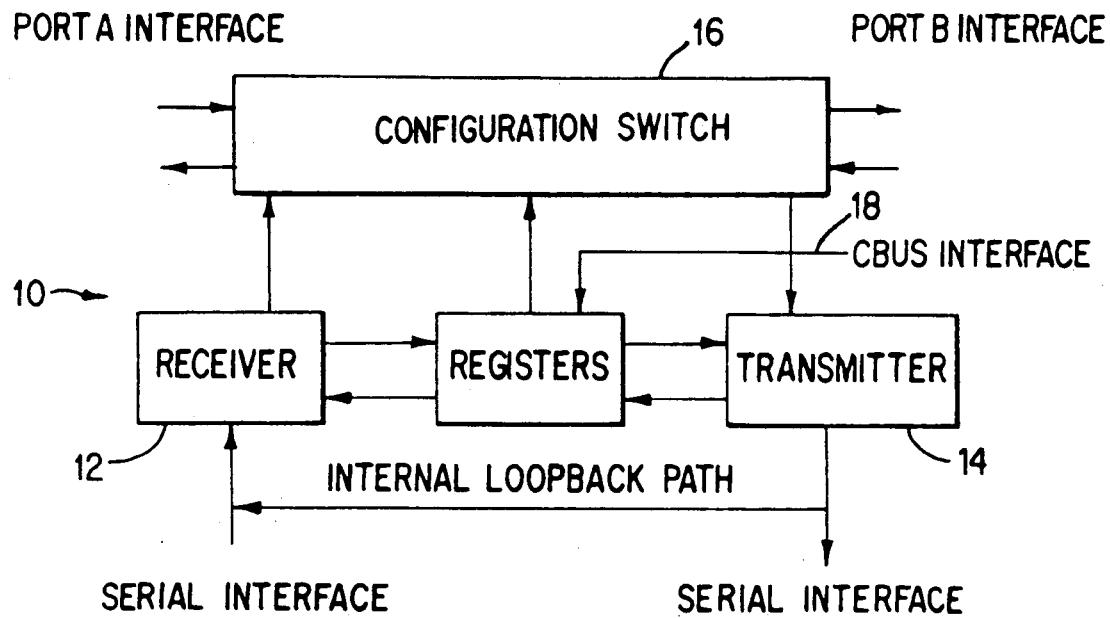
FIG. 3 is a block diagram of a Physical function in compliance with the FDDI protocol.

FIG. 3 shows a block diagram of a Physical Layer Controller (Player) 10 which implements the Physical function as defined by the Fiber Distributed Data Interface (FDDI) protocol.

The Player 10 includes four primary blocks: a receiver 12, a transmitter 14, a configuration switch 16 and a control bus interface 18. The Player 10 also incorporates a number of storage registers which retain data which define the operating characteristics of the Player 10.

The receiver 12 accepts serial binary information from either the serial interface with the FDDI network fiber optic receiver (PMD) or from the transmitter 14 via an internal loopback path. The receiver 12 converts the information stream from Non-Return-To-Zero-Invert-On-Ones (NRZI) format utilized on the FDDI medium to Non-Return-To-Zero (NRZ) format used internally by the receiving station and decodes the NRZ data from externalcoding to internal coding. The receiver 12 establishes the 5-bit symbol boundaries for the serial bit stream and synchronizes the local station clock to the upstream station's clock. The receiver 12 also performs line state detection, link error detection and presents the data to the configuration switch 16 as internally coded symbol pairs.

The transmitter 14 accepts information characters as symbol pairs from the configuration switch 16. It encodes the symbol pairs from the internal coding to the external coding, filters out code violations in the information stream and redistributes Idle bytes which were added or deleted by the elasticity buffer. In addition, transmitter 14 is capable of generating Idle, Master, Halt, Quiet or other user defined symbol pairs. The transmitter 14 also converts the stream from NRZ to NRZI and presents it to either the receiver 12 via the internal loopback path or to the FDDI fiber optic transmitter (PMD) as a serial bit stream.

The primary function of the configuration switch 16 is to configure the information flow to support multiple station configurations for different station types without external logic.

The control bus interface 18 allows the user to program the configuration switch 16, to enable and disable functions within the receiver 12 and the transmitter 14, to report line states and link errors detected by the receiver 12 and to report error conditions.

FIGS. 4A and 4B provide control and data symbol code maps, respectively, for the conversion of the standard FDDI external code patterns shown in Table I above to internal code points in accordance with the present invention. In the FIG. 4A and FIG. 4B symbol code maps, V' denotes a PHY invalid or an elasticity buffer stuff byte and I' denotes I in ILS or an elasticity buffer stuff byte, where a "stuff byte" is a certain byte that is forced into the elasticity buffer, as described below, regardless of the actual symbol pair received, when in most line states other than Active Line State (ALS). An "N" indicates reception of a data symbol that is paired with a control symbol; since a data symbol paired with a control symbol is an error, it is reported with a single error control point "N" rather than giving it a specific value. An "I" indicates an Idle symbol that is received in Active Line State (ALS), which is the normal course of events after a frame; I' indicates that enough Idle symbols have been received to have entered the Idle Line State (ILS), which for all practical purposes means that an Idle byte has been received. (While this is not always the actual case, it causes no harm for the MAC or the transmitter to treat it that way.)

Note that in the control code map shown in FIG. 4A, internal code points are organized into code point groups such that the decoding logic requirements of both the receiver block and transmit block of the Player 10 and of the Media Access Control function are minimal. For example, the control symbols T, S and R share "10" as the D2 and D3 symbol digits. Similarly, the Idle byte symbols I and I' share "01" as the D2 and D3 bits, respectively.

There are certain code points that are impossible to obtain from the Player's receive function; these code points are denoted by "don't cares", i.e "X", in the FIG. 4A mapping. The decoding can take advantage of these "don't care" symbols. Since time to perform the logic is limited, the simpler the logic, the more other logic functions can be performed in the same clock period. Overall, this approach both saves chip area and reduces the latency of the node containing this function which, in turn, increases performance.

As shown in FIGS. 4A and 4B, each internal symbol can be either a control code point or a data code point. However, taking advantage of the fact that FDDI control code points and data code points cannot legally be mixed in a symbol pair, only one control bit is necessary for each symbol pair instead of two control bits. That is, theoretically, one control bit should accompany each symbol so that the type of each symbol can be identified. However, since no station can legitimately transmit a mixed control/data symbol pair, the Player may treat such a pair as an error and coerce the data symbol into a special control code point reserved for that purpose. Therefore, the Media Access Control function can be advised that an error has occurred.

Figure 5:
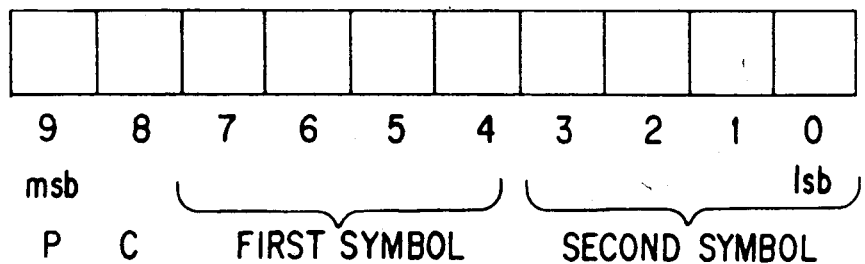
FIG. 5 is a schematic representation of the format of a data byte transferred between the Physical function and the Media Access Control function in accordance with the present invention.

The format of an FDDI byte transferred between an FDDI PHY function and the Media Access Control function is shown in FIG. 5.

Each FDDI symbol pair is protected by a parity bit P. The Player 10 generates the parity as part of the decoding process before presenting data to the Media Access Control function and the Media Access Control function checks the parity. Parity is also generated when the Media Access Control function sends data through the Player 10 and the Player 10 checks it.

The present invention also provides for inclusion of line state information in the Player output via the internal code points. When the Player 10 is receiving normal data in a frame, it is in Active Line State (ALS) and the internal code points correspond to the symbols received from the fiber optic medium. However, when symbols are received that take the Player 10 out of Active Line State (ALS), then the internal codes I' or V' may be presented to the Media Access Control (MAC) and Station Management (SMT) functions.

Referring to FIG. 5, and as described in greater detail below, the second symbol following either an I' or V' symbol always identifies the current line state. The Station Management function, or any other entity, can use this line state information to make control decisions.

When the Player 10 enters a PHY invalid condition, it means that the data being presented to the Media Access Control function by the Player 10 is being corrupted. Thus, via the data received, the Media Access Control function can fully decode this condition. The Media Access Control function then discards all data received and takes other recovery actions as appropriate. This feature of the Player 10 is also discussed in greater detail below.

The code points also provide internal synchronization. A quantity called "repeatable symbol" is used to allow the elasticity buffer of the Player 10 to make intelligent decisions during synchronization of the receive clock and the transmit clock. Repeatable symbols are those that the elasticity buffer can skip or duplicate, i.e., I' or V'.

Thus, the internal code points provided at the Player-MAC interface are, in accordance with the present invention, a unique set of code patterns that accomplish all of the aforementioned functions, which would otherwise consume extra chip pins and chip logic.

Figure 6:
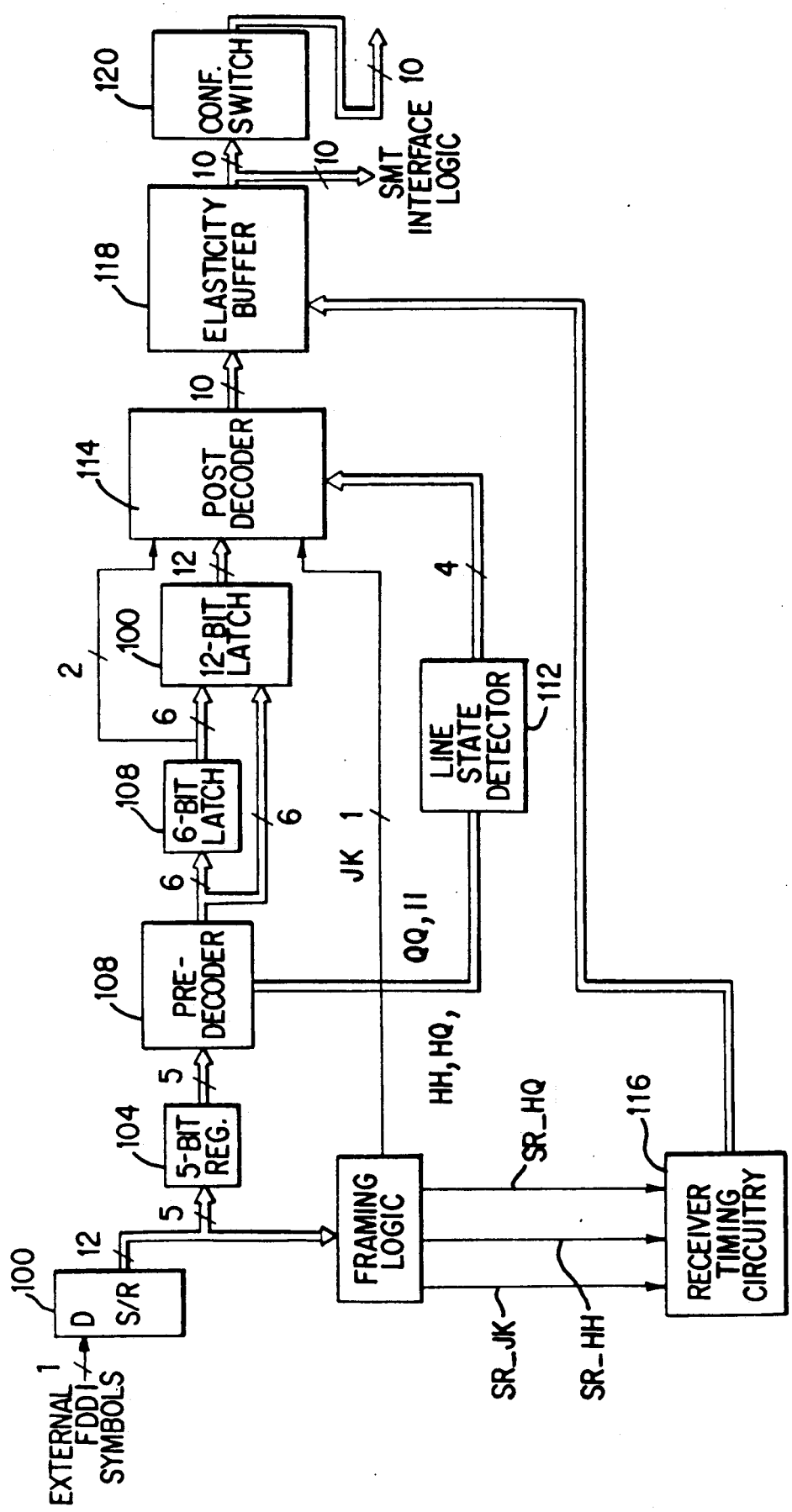
FIG. 6 is a block diagram illustrating an embodiment of a Physical function receiver for generating internal code points in accordance with the present invention.

A block diagram of an embodiment of a Player 10 receiver block 12 which can be utilized to accomplish encoding of FDDI symbols received from the transmission medium to internal code points in accordance with the present invention is shown in FIG. 6.

The receiver 12 shown in FIG. 6 receives a serial bit stream from the FDDI transmission medium, identifies standard FDDI symbols from the external symbol set provided in Table I above, decodes the identified external symbols to provide preliminary internal code points, and then adjusts the preliminary internal code points as required to provide internal code points consistent with the characteristics of the received data.

More specifically, the external FDDI symbols are received serially from the FDDI fiber optic medium by a 12-bit serial-in, parallel-out shift register 100. The 12-bit output of the shift register 100, which represents 10 bits of current data plus 2 "look-behind" history bits from the previous byte, is provided to framing logic 102. Framing logic 102 detects certain patterns in the received bit stream for establishing byte boundaries in the incoming bit stream as necessary. For example, upon detection of a start delimiter symbol pair JK, the framing logic so notifies a post decoder 114, as described below. The two history bits permit greater accuracy in identifying bit stream characteristics, such as line state information.

5-bits of the 12-bit output of shift register 100 are provided to a 5-bit latch 104 to allow the 5-bit binary combination to settle.

The 5-bit symbol latched into the register 104 is then clocked into a predecoder 106. The predecoder 106 comprises a lookup table which converts the 5-bit input from the register 104 into a 6-bit output that includes a corresponding 5-bit preliminary code pattern plus a parity bit. The 6-bit output of predecoder 106 in then provided to a 6-bit latch 108 to allow combining with the next symbol.

For the second symbol of each pair, the 6-bit output of the predecoder 106 is also provided to a 12-bit latch 110 which, when combined with the previous output stored in the 6-bit latch 108, provides a 12-bit preliminary code pattern output comprising two 6-bit patterns "a" and "b" and having the following format:

PaCa a3a2a1a0 PbCb b3b2b1b0

The predecoder 106 also provides decoded control symbols to a line state detector 112 which detects the minimum number of sequential line state symbols within the received symbol stream required to enter a certain line state. Table II below lists line states supported by the Player 10:

TABLE II

| | |
|---|---|
| Active Line State (ALS) | Upon reception of a JK symbol pair |
| Idle Line State (ILS) | Two Idle symbol pairs |
| Super Idle Line State | Eight consecutive Idle symbol pairs |
| No Signal Detect (NSD) | Upon the deassertion of TTLSD |
| Master Line State (MLS) | Eight consecutive Halt-Quiet symbol pairs |
| Halt Line State (HLS) | Eight consecutive Halt-Halt symbol pairs |
| Quiet Line State (QLS) | Eight consecutive Quiet-Quiet symbol pairs |
| Noise Line State (NLS) | Sixteen noise events |
| Line State Unknown (ULS) | Upon reception of an inconsistent byte with respect to current line state |

The output of the line state detector 112, which identifies the detected line state, is provided to a post decoder 114 which also receives the output of the 12-bit latch 110. The post decoder 114 responds to the 12-bit preliminary code pattern output from latch 108, the output of the framing logic 102, and the output of the line state detector 112 to generate a 10-bit internal code point symbol pair or byte, formatted as illustrated in FIG. 5.

If the post decoder 114 is in Active Line State (ALS), then it simply provides a replica of its input to the elasticity buffer 118. Table III provides examples of symbol pairs generated by the post decoder 114 (according to the FIG. 5 format) in the Active Line State (ALS).

TABLE III

| Symbol Pair | Code |   |   |   |
|---|---|---|---|---|
|  | P | C | 7654 | 3210 |
| nn | P | 0 | n | n |
| NC | P | 1 | 0000 | C |
| CN | P | 1 | C | 0000 |
| WW | P | 1 | W | W |
| Vx | P | 1 | 0010 | xxxx |
| xV | P | 1 | xxxx | 0010 |
| Hx | P | 1 | 0001 | xxxx |
| xH | P | 1 | xxxx | 0001 |
| Ix | P | 1 | 1010 | xxxx |
| xI | P | 1 | xxxx | 1010 |

Key: P = parity bit
C = any control symbol in {I,V,R,S,T,H}
n = any data symbol in {0,1,2 ... F}
N = internal code point for data in a data/control mixed byte
W = any control symbol in {R,S,T}
X = any symbol in {N,C}
H = Halt symbol
I = Idle symbol received in ALS
V = violation symbol
ⓒNational Semiconductor Corporation 198

However, when the line state decoder 112 informs the post decoder 114 that an abnormal line state has been detected, then the post decoder 114 generates a symbol pair comprising an I' or V' symbol, indicating a violation, accompanied by a symbol that identifies the detected line state. Table IV below identifies symbol pairs generated by the post decoder 114 (according to the FIG. 5 format) under these conditions:

TABLE IV

| Symbol Pair | Code<br>P C 7654 3210 |
|---|---|
| V' LS | P 1 0011 U LS |
| I' LS | P 1 1011 U LS |

Key: V' = PHY invalid or stuff byte before JK
U = Unknown bit (reception of symbol not pertaining to the Line State)
Unknown = 1
Not Unknown = 0
LS = Line State:
ALS = 000
ILS = 001
NSD = 010
MLS = 100
HLS = 101
QLS = 110
NLS = 111
I' = Any symbol in ILS is smoothed out as I'; I' can also represent a stuff byte before a JK (I' = 1011)
ⓒNational Semiconductor Corporation 198

Similarly, when the framing logic 102 indicates to the post decoder 114 that it has detected a JK symbol pair, the post decoder 114 generates an I' or V' symbol pair as a stuff byte as an input to elasticity buffer 118. A JK symbol pair is never written into the elasticity buffer 118. It is, however, read from the elasticity buffer 118, as described in copending and commonly-assigned U.S. application Ser. No. 444,619 filed Dec. 1, 1989, titled BYTE-WIDE ELASTICITY BUFFER, which provides further details regarding elasticity buffer 118 and which is hereby incorporated by reference.

The desire to utilize both predecoder 106 and post decoder 114 rather than a single decoder that incorporates adjustment logic with raw code conversion arises because, as stated above, there exist received symbols that can be converted to different internal code points depending on the line state conditions or the occurrence of a start delimiter symbol pair JK. Again, as stated above, the line state detector 112 also accepts control signals from the predecoder 106. If a combined complex decoder approach is taken, then it would require additional clock cycles for the line state detector 112 to receive updated information, which can then be incorporated by the combined decoder, thus slowing down reception time on the ring. It is more desirable to free up the predecoder 106 as soon as possible to allow it to decode the next received symbol, thereby pipelining the decoding and line state detection functions.

Thus, the post decoder 114 helps filter out corruptions in the Idle Line State (ILS), inserts a stuff byte when necessary to allow compensation for timing differences in the elasticity buffer 118, incorporates line state information in the symbol pairs leaving the elasticity buffer to provide synchronized line state information to the Station Management function (SMT) via a separate tap from the elasticity buffer reader to speed up the entire decoding process (otherwise, additional synchronization logic would be required to report line state information to SMT), and allows J symbols and K symbols to be interpreted differently in different circumstances; for example, J and K are treated as violations when not processed as a pair by the framing logic 102.

According to one embodiment of the invention, the post decoder 114 is implemented as a large multiplexor bank. As shown in the state table provided in FIG. 7, each of the 10 bits of information comprising the output of post decoder 114 is the output of a multiplexing of several possibilities for that particular bit. Therefore, ten multiplexors are required. The parity bit, for example, is the output of a logical 5 to 1 mux, the possibilities being PA XNOR PB, PA, PB, 0, 1.

The type of stuff byte used to fill a possible time gap between reception of a start delimiter symbol pair JK and its reading from elasticity buffer 118 is determined in the post decoder 114 by checking, via a 2-bit signal received from the six bit latch 108, whether or not the byte prior to the JK byte is an Idle byte. If it is, then the stuff byte is I'ULS; if it is not, then the stuff byte is V'ULS.

The byte-wide internal code points generated by the post decoder 114 are written into an elasticity buffer 118 in response to control signals provided by receiver timing circuitry 116 which responds to the outputs of the framing logic 102.

A delay is provided between the initiation of the elasticity buffer write pointer by receipt of a JK start delimiter and the initiation of the elasticity buffer read pointer. Upon each read access of the elasticity buffer, byte-wide data is transferred from the elasticity buffer 118 to a configuration switch 120. The configuration switch 120 either forwards the data for processing by the Media Access Control function of the logic receiver station or provides the data to the transmit logic of the Player 10 for retransmission on the FDDI medium, all in accordance with the FDDI protocol.

As indicated in FIG. 6, detection of an overflow/underflow condition in the elasticity buffer 118 results in generation of an overflow/underflow flag which causes a PHY·invalid symbol to be provided as the output of the configuration switch 120; this condition is more fully described in the above-referenced BYTE-WIDE ELASTICITY BUFFER application.

Greater detail regarding the configuration switch 120 may be obtained by reference to co-pending and commonly-assigned U.S. application Ser. No. 444,189, filed Dec. 1, 1990, titled CONFIGURATION SWITCH, which application is hereby incorporated by reference.

It should be understood that various alternatives to the embodiment of the invention described herein may be employed in practicing the invention. It is intended that the following claims define the scope of the invention and that structures within the scope of these claims and their equivalents be covered thereby.

What is claimed is:

1. Apparatus for transferring an information stream comprising a sequence of multi-bit information characters from a transmission medium to a receiving node, the information stream having one of a plurality of possible line states associated therewith, each multi-bit information character comprising an external code pattern that uniquely identifies the multi-bit information character, the apparatus comprising:
   (a) means for identifying external code patterns in the information stream;
   (b) means for converting identified external code patterns to corresponding internal code symbols;
   (c) means for detecting the line state of the received information stream; and
   (d) means for adjusting the internal code symbols to convey information corresponding to the detected line state.

2. In an FDDI token ring network, apparatus for transferring a data stream comprising a sequence of external FDDI symbols received from an FDDI optical fiber transmission medium to a receiving node, the data stream having one of a plurality of possible line states associated therewith, the apparatus comprising:
   (a) predecoder means for identifying received external FDDI symbols and for converting identified external FDDI symbols to corresponding internal code symbols to provide a sequence of internal code symbols;
   (b) a line state detector for detecting the line state of the received data stream;
   (c) means for combining adjacent internal code symbols in the sequence of internal code symbols to provide a sequence of internal code bytes; and
   (d) post decoder means responsive to the detected line state for adjusting the internal code bytes to provide a sequence of output bytes that convey information corresponding to the detected line state.

3. Apparatus as in claim 2 wherein each output byte includes a first symbol and a second symbol, the second symbol conveying the identity of the detected line state.

4. Apparatus as in claim 3 wherein the detected line state is selected from the group consisting of Active Line State (ALS), Idle Line State (ILS), Master Line State (MLS), Halt Line State (HLS), Quiet Line State (QLS), Noise Line State (NLS), and Unknown Line State (ULS).

5. Apparatus as in claim 4 wherein the second symbol includes a 3-bit binary sequence that identifies the detected line state and a fourth bit that indicates whether the current line state is unknown.

6. Apparatus as in claim 5 wherein the correspondence between the 3-bit binary sequence and the detected line state is as follows:
   ALS=000
   ILS=001
   MLS=100
   HLS=101
   QLS=110
   NLS=111.

7. Apparatus as in claim 1 and further including means for identifying errors in the received information stream and wherein the means for adjusting includes means for generating internal code points representing the identified errors in the received information stream.

8. Apparatus as in claim 3 wherein each output byte includes only one control bit.

9. Apparatus as in claim 3 wherein the post decoder means includes means for adjusting an internal code byte that includes a control symbol and a data symbol to provide a corresponding output byte that includes a special control code point.

10. A method of transferring an information stream comprising a sequence of multi-bit information characters from a transmission medium to a receiving node, the information stream having one of a plurality of possible line states associated therewith, each multi-bit information character comprising an external code pattern than uniquely identifies the multi-bit information character, the method comprising:
    (a) identifying external code patterns in the information stream;
    (b) converting identified external code patterns to corresponding internal code symbols;
    (c) detecting the line state of the received information stream; and
    (d) adjusting the internal code symbols to internal code points that convey information corresponding to the detected line state.

11. In an FDDI token ring network, a method of transferring a data stream comprising a sequence of external FDDI symbols received from an FDDI optical fiber transmission medium to a receiving node, the data stream having one of a plurality of possible line states associated therewith, the method comprising
    (a) identifying received external FDDI symbols;
    (b) converting identified external FDDI symbols to corresponding internal code symbols to provide a sequence of internal code symbols;
    (c) detecting the line state of the received data stream;
    (d) combining adjacent internal code symbols in the sequence of internal code symbols to provide a sequence of internal code bytes; and
    (e) adjusting the internal code bytes to provide a sequence of output bytes that convey information corresponding to the detected line state.

12. A method as in claim 11 wherein each output byte includes only one control bit.

13. A method as in claim 11 wherein each output byte includes a first symbol and a second symbol, the second symbol conveying the identity of the detected line state.

14. A method as in claim 13 wherein the detected line state is selected from the group consisting of Active Line State (ALS), Idle Line State (ILS), Master Line State (MLS), Halt Line State (HLS), Quite Line State (QLS), Noise Line State (NLS) and Unknown Line State (ULS).

15. A method as in claim 14 wherein the second symbol includes a 13-bit binary sequence that identifies the detected line state and a fourth bit that indicates whether the current line state is unknown.

16. A method as in claim 15 wherein the correspondence between the 3-bit binary sequence and the detected line state is as follows:
    ALS=000
    ILS=001
    MLS=100
    HLS=101
    QLS=110
    NLS=111.

* * * * *

UNITED STATES PATENT AND TRADEMARK OFFICE
CERTIFICATE OF CORRECTION

PATENT NO. : 5,046,182

DATED : September 3, 1991

INVENTOR(S) : James R. Hamstra, Et al.

It is certified that error appears in the above - identified patent and that said Letters Patent is hereby corrected as shown below:

In Col. 12, correct claim 15 to read as follows:

--15. A method as in claim 14 wherein the second symbol includes a 3-bit binary sequence that identifies the detected line state and a fourth bit that indicates whether the current line state is unknown.--

Signed and Sealed this

Sixteenth Day of March, 1993

Attest:

STEPHEN G. KUNIN

*Attesting Officer*    Acting Commissioner of Patents and Trademarks